US012556059B2

(12) United States Patent
Hwang et al.

(10) Patent No.: US 12,556,059 B2
(45) Date of Patent: Feb. 17, 2026

(54) MOTOR AND CLEANER HAVING THE SAME

(71) Applicant: SAMSUNG ELECTRONICS CO., LTD., Suwon-si (KR)

(72) Inventors: Woong Hwang, Suwon-si (KR); Wonsoo Kang, Suwon-si (KR); Jimin Kim, Suwon-si (KR); Taesang Park, Suwon-si (KR); Sangmo Shin, Suwon-si (KR); Jinwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 18/209,597

(22) Filed: Jun. 14, 2023

(65) Prior Publication Data

US 2023/0327510 A1 Oct. 12, 2023

Related U.S. Application Data

(63) Continuation of application No. PCT/KR2021/018777, filed on Dec. 10, 2021.

(30) Foreign Application Priority Data

Jan. 29, 2021 (KR) .................... 10-2021-0013331

(51) Int. Cl.
*H02K 7/08* (2006.01)
*A47L 9/22* (2006.01)
(Continued)

(52) U.S. Cl.
CPC ............. *H02K 5/1732* (2013.01); *A47L 9/22* (2013.01); *F16C 19/08* (2013.01); *H02K 7/083* (2013.01)

(58) Field of Classification Search
CPC ........... H02K 3/34; H02K 3/345; H02K 3/52; H02K 3/522; H02K 5/00; H02K 5/08;
(Continued)

(56) References Cited

U.S. PATENT DOCUMENTS

| 8,581,453 B2 | 11/2013 | Wada et al. |
| 11,202,541 B2 | 12/2021 | Keil et al. |
| 2010/0127585 A1 | 5/2010 | Fee et al. |

FOREIGN PATENT DOCUMENTS

| EP | 1420099 A2 * | 5/2004 | ............... H02K 5/17 |
| EP | 2 736 153 B1 | 4/2020 | |

(Continued)

OTHER PUBLICATIONS

International Search Report dated Apr. 5, 2022 in International Patent Application No. PCT/KR2021/018777.
(Continued)

*Primary Examiner* — Tran N Nguyen
(74) *Attorney, Agent, or Firm* — STAAS & HALSEY LLP

(57) ABSTRACT

A motor and a cleaner including the same where the motor includes a stator including a stator including a stator core, a rotating shaft arrangeable inside of the stator, a rotor rotatable about the rotating shaft by electromagnetically interacting with the stator while the rotating shaft is arranged inside the stator, a housing to accommodate the stator and the rotor, a bearing coupleable to the housing so that while the bearing is coupled to the housing, the bearing supports a rotation of the rotor about the rotating shaft while the stator and the rotor are stably accommodated in the housing and a frame to support the bearing in the housing, the frame being positioned in the housing to be in contact with the stator core and the bearing to allow the stator core and the bearing to be electrically connected.

13 Claims, 8 Drawing Sheets

(51) Int. Cl.
  *F16C 19/08*  (2006.01)
  *H02K 5/173*  (2006.01)

(58) Field of Classification Search
  CPC .. H02K 5/14; H02K 5/15; H02K 5/16; H02K 5/161; H02K 5/17; H02K 5/173; H02K 5/1732; H02K 5/22; H02K 5/225; H02K 5/24; H02K 7/08; H02K 7/083; H02K 7/10; H02K 7/14; H02K 7/145; H02K 9/00; H02K 9/04; H02K 9/06; H02K 11/00; H02K 11/009; H02K 11/0094; H02K 11/21; H02K 11/215; H02K 11/30; H02K 11/33; H02K 11/34; H02K 11/40; H02K 5/06; H02K 7/003; F16C 19/08; F16C 35/077; F16C 41/002; F16C 2380/26
  See application file for complete search history.

(56) References Cited

FOREIGN PATENT DOCUMENTS

| | | | | |
|---|---|---|---|---|
| JP | 2010-206984 | 9/2010 | | |
| JP | 2014-124082 | 7/2014 | | |
| JP | 2016-208579 | 12/2016 | | |
| JP | 2018-93710 | 6/2018 | | |
| JP | 2019-134526 | 8/2019 | | |
| JP | 2020-96530 | 6/2020 | | |
| JP | 2020167827 A * | 10/2020 | ............. | H02K 7/003 |
| KR | 10-2016-0004547 | 1/2016 | | |
| KR | 10-2017-0091294 | 8/2017 | | |
| KR | 10-2018-0065621 | 6/2018 | | |
| KR | 10-2018-0130860 | 12/2018 | | |
| KR | 10-2020-0034676 | 3/2020 | | |
| KR | 10-2117369 | 6/2020 | | |
| WO | WO2017104431 A1 * | 6/2017 | ............... | H02K 5/17 |

OTHER PUBLICATIONS

PCT/ISA/237 dated Apr. 5, 2022 in International Patent Application No. PCT/KR2021/018777.
Korean Office Action dated Mar. 24, 2025 for Korean Application No. 10-2021-0013331.
Korean Office Action dated May 30, 2025 for Korean Application No. 10-2021-0013331.

* cited by examiner

MOTOR AND CLEANER HAVING THE SAME

CROSS-REFERENCE TO RELATED APPLICATION

This application is a continuation application, under 35 U.S.C. § 111(a), of international application No. PCT/KR2021/018777, filed on Dec. 10, 2021, which claims priority under 35 U. S. C. § 119 to Korean Patent Application No. 10-2021-0013331, filed Jan. 29, 2021, the disclosures of which are incorporated herein by reference in their entireties.

BACKGROUND

Field

The disclosure relates to a motor and a cleaner including the same, and more particularly, to a cleaner including a motor having improved durability.

Description of Related Art

In general, a motor is a machine that generates rotational force from electric energy, and includes a stator and a rotor. The rotor is configured to interact electromagnetically with the stator and is rotated by force that acts between a magnetic field and the current flowing through a coil.

The motor may include a stator, a rotor provided to rotate, a housing accommodating the stator and the rotor, and a bearing for stably rotating the rotor by combining the stator and the rotor at an accurate position.

Motors can be used in a variety of cleaners. For example, the motor may be disposed in the body of the cleaner to generate power.

As the motor is used, electrolytic corrosion may occur in the bearing. When the motor is driven, switching occurs, and the current flowing in the stator may generate an induced current in the rotor. The induced current thus generated may move from the rotor to a rotating shaft. In addition, the induced current may be transmitted to the rotating shaft and an inner ring, ball, and outer ring of the bearing, respectively. At this time, a potential difference is generated between the inner and outer ring of the bearing, which may damage the ball.

That is, bearings may be damaged by electrolytic corrosion and noise may be generated. Therefore, there is a recent demand to minimize corrosion of bearings. In addition, there is an increasing demand for light weight of the motor for ease of use.

SUMMARY

A motor according to one of various embodiments of the disclosure may include a stator including a stator core, a rotating shaft arrangeable inside of the stator, a rotor rotatable about the rotating shaft by electromagnetically interacting with the stator while the rotating shaft is arranged inside the stator, a housing to accommodate the stator and the rotor, a bearing coupleable to the housing so that while the bearing is coupled to the housing, the bearing supports a rotation of the rotor about the rotating shaft while the stator and the rotor are stably accommodated in the housing and a frame to support the bearing the housing, the frame being positioned in the housing to be in contact with the stator core and the bearing to allow the stator core and the bearing to be electrically connected.

The frame is integrally formed with the housing, and the housing may be injection molded after inserting the frame which is formed of metal.

The bearing is among a plurality of bearings and the frame may be is among a plurality of frames, the plurality of frames may include an upper frame above the stator core and a lower frame below the stator core, and the plurality of bearings may include a first bearing to be seated on the upper frame and a second bearing to be seated on the lower frame.

The upper frame may include a first seating hole at an upper end of the upper frame to seat the first bearing, and the lower frame may include a second seating hole at a lower end of the lower frame to seat the second bearing.

The upper frame may include a first base on which the first seating hole is formed, and a first contact rib which extends downward from the first base to contact the stator core, and the lower frame may include a second base on which the second seating hole is formed, and a second contact rib which extends upward from the second base to contact the stator core.

The first contact rib and the second contact rib may be in contact an outside of the stator core, and the housing may include at least one support rib inside of at least one of the first contact rib or the second contact rib to support the stator core.

The motor further may include an adhesive member to respectively couple the frame and the bearing and at least one cover member configured to cover the adhesive member to improve adhesive strength of the adhesive member.

The bearing is among a plurality of bearings, the frame is among a plurality of frames, and the adhesive member may be among a plurality of adhesive members, the plurality of frames may include an upper frame above the stator core and including a first base formed on a upper portion of the upper frame and a first seating hole formed in the first base, and a lower frame below the stator core and including a second base formed on a lower portion of the lower frame and a second seating hole formed in the second base, the plurality of bearings may include a first bearing seated in the first seating hole and a second bearing seated in the second seating hole, the plurality of adhesive members may include a first adhesive member to couple the upper frame and the first bearing, and a second adhesive member to couple the lower frame and the second bearing, and the at least one cover member may be configured to cover at least one of the first adhesive member or the second adhesive member.

The first bearing may protrude upward more than the first base, and the first adhesive member may be formed to surround an outer ring of the first bearing protruding upward, and the second bearing may protrude more downward than the second base, and the second adhesive member may be formed to surround an outer ring of the second bearing protruding downward.

The motor further may include an impeller, coupleable to the rotating shaft at an upper portion of the housing, and configured to generate air flow, and wherein the first bearing may have a larger cross-sectional area than the second bearing to support a load of the impeller.

A motor according to one of the various embodiments of the disclosure may include a stator including a stator core, a rotating shaft arrangeable inside of the stator, a rotor rotatable about the rotating shaft in electromagnetic interaction with the stator while the rotating shaft is arranged inside the stator, a housing to accommodate the stator and rotor, and a frame formed of metal, coupleable to the inside of the housing, and configured to be in contact with the stator core, a bearing to be seated on the frame so that the stator and rotor are stably coupled, an adhesive member to be applied to the frame and the bearing to bond the frame and the bearing, and at least one cover member configured to cover the adhesive member, and in contact with the frame and the bearing, respectively, so that current flow between the frame and the bearing.

The bearing, the frame, and the adhesive member may be provided in plurality, the plurality of frames may include an upper frame disposed above the stator core and including a first base formed on a upper portion of the upper frame and a first seating hole formed in the first base, and a lower frame disposed below the stator core and including a second base formed on a lower portion of the lower frame and a second seating hole formed in the second base, the plurality of bearings may include a first bearing seated in the first seating hole and a second bearing seated in the second seating hole, the plurality of adhesive members may include a first adhesive member to couple the upper frame and the first bearing, and a second adhesive member to couple the lower frame and the second bearing, and the at least one cover member configured to cover at least one of the first adhesive member and the second adhesive member The first bearing may protrude upward more than the first base, and the first adhesive member may be formed to surround an outer ring of the first bearing protruding upward, and the second bearing may protrude more downward than the second base, and the second adhesive member may be formed to surround an outer ring of the second bearing protruding downward.

The housing may be formed by inserting the frame to be integrally formed with the frame and then injection molding.

The frame may be provided in plurality, and the plurality of frames may include an upper frame including a first base provided on an upper portion of the stator core and a first contact rib extending downward from the first base to contact the stator core and a lower frame including a second base provided below the stator core and a second contact rib extending upward from the second base to contact the stator core.

The bearing may be provided in plurality, the plurality of bearings may include a first bearing seated on the first base and a second bearing seated on the second bearing, the motor may further include an impeller coupleable to the rotating shaft at an upper portion of the housing to generate a flow of air, and the first bearing may have a larger cross-sectional area than the second bearing to support the load of the impeller.

A cleaner according to one of the various embodiments of the disclosure may include a main body, a suction head provided to suck foreign substances from the surface to be cleaned into the main body and a motor disposed inside the main body to generate a suction force, wherein the motor may include a stator including a stator core, a rotor that electromagnetically interacts with the stator and rotates about a rotating shaft disposed within the stator, a housing provided to accommodate the stator and the rotor, a bearing coupleable to the housing, and a frame integrally formed with the housing so that the stator and the rotor are stably coupled, formed of metal and in contact with the stator core to conduct electricity between the stator core and the bearing.

The frame may include a seating hole configured to accommodate the bearing, and the bearing may come into contact with an inner surface forming the seating hole.

The motor may include an adhesive member adhered to the frame and the bearing to couple the frame and the bearing, and a cover member configured to cover the adhesive member and an outer ring of the bearing.

The cover member may be formed of metal to conduct electricity between the frame and the bearing, and contact the frame and the bearing, respectively.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
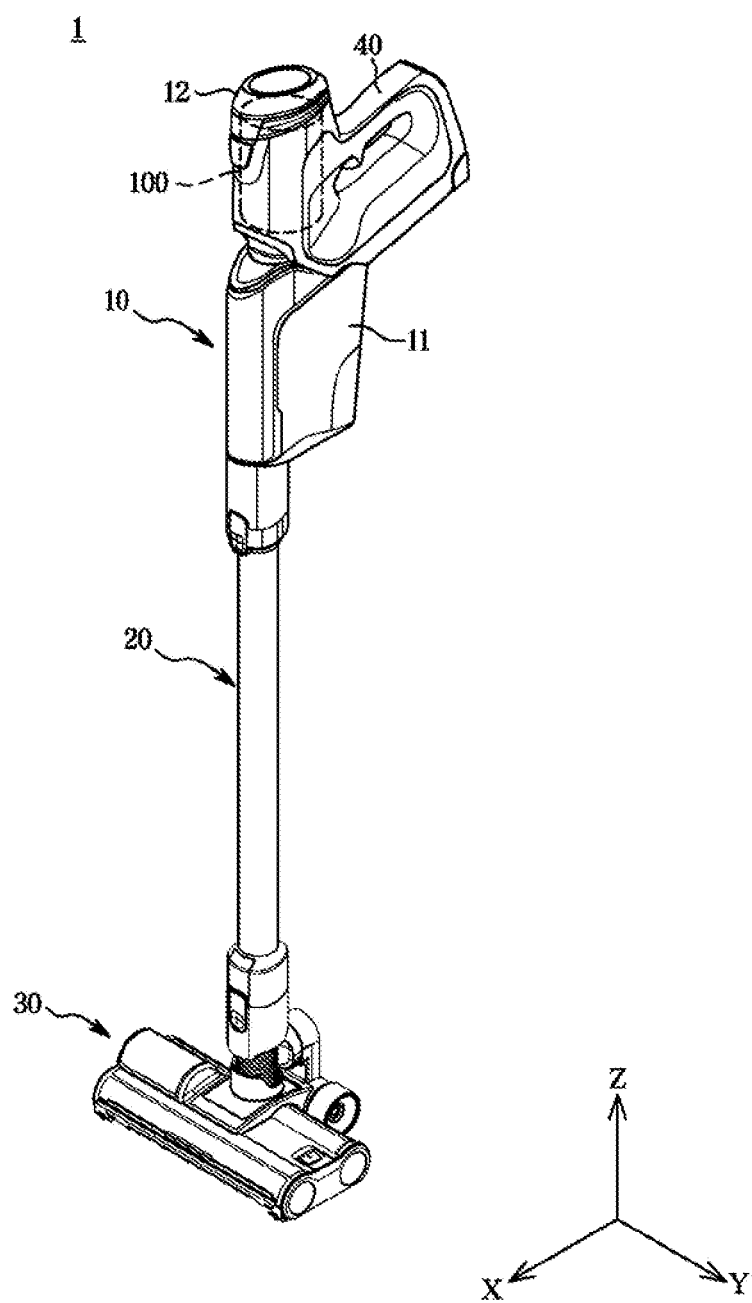
FIG. 1 is a view illustrating a cleaner including a motor according to one embodiment of the disclosure.

Embodiments described in the disclosure and configurations shown in the drawings are merely examples of the embodiments of the disclosure, and may be modified in various different ways at the time of filing of the disclosure to replace the embodiments and drawings of the disclosure.

In addition, the same reference numerals or numerals presented in each drawing in this disclosure indicate parts or components that perform substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term "and/or" includes any combination of a plurality of related listed items or any of a plurality of related listed items.

Meanwhile, as used in the following description, the terms "front," "rear," "left," "right," and the like are defined with reference to the drawings and are not intended to limit the shape and position of each component.

In addition, various embodiments of the disclosure may be used in a variety of household appliances, including cleaners, but will be described herein with reference to cleaners.

One aspect of the disclosure, a motor having improved durability and a light weight, and a cleaner including the same can be provided.

Another aspect of the disclosure, a motor having improved coupling properties and a cleaner including the motor can be provided.

According to various embodiments of the disclosure, a motor capable of improving durability and reducing weight by reducing wear of bearings and a cleaner including the same can be provided.

According to various embodiments of the disclosure, a motor having improved coupling force between components and a cleaner including the motor can be provided.

Hereinafter exemplary embodiments of the disclosure will be described in detail with reference to the accompanying drawings.

FIG. 1 is a view illustrating a cleaner including a motor according to one embodiment of the disclosure.

Referring to FIG. 1, a cleaner 1 according to one of various embodiments of the disclosure may include a motor 100. The type of cleaner 1 is not limited. For example, the motor 100 may be used in a stick-type cleaner or an upright-type cleaner.

In addition, the motor 100 may be applied to various home appliances other than a cleaner. Hereinafter a description will be given focusing on the stick-type cleaner 1 including the motor 100.

The cleaner 1 may include a cleaner body 10 and a suction head 30. The cleaner 1 may include a stick 20 configured to connect the cleaner body 10 to the suction head 30, and a handle 40 connected to the cleaner body 10.

The handle 40 is a part that is coupled to the cleaner body 10 and thus a user may manipulate the cleaner 1 by gripping the handle 40. A manipulator (not shown) may be provided in the handle 40 so as to allow a user to operate the cleaner 1.

The suction head 30 may be provided below the cleaner body 10 and disposed to be in contact with a surface to be cleaned. The suction head 30 may be provided to be in contact with the surface to be cleaned to suction dust or dirt on the surface to be cleaned toward an inside of the cleaner body 10 by a suction force generated by the motor 100.

The cleaner body 10 may include a dust collector 11 and a drive device 12 provided therein. The dust collector 11 may be configured to collect dust or dirt that is on the surface to be cleaned and then sucked through the suction head 30.

The drive device 12 may include the motor 100 configured to drive the cleaner 1. The motor 100 may generate power to generate a suction force in the cleaner body 10.

Figure 2:
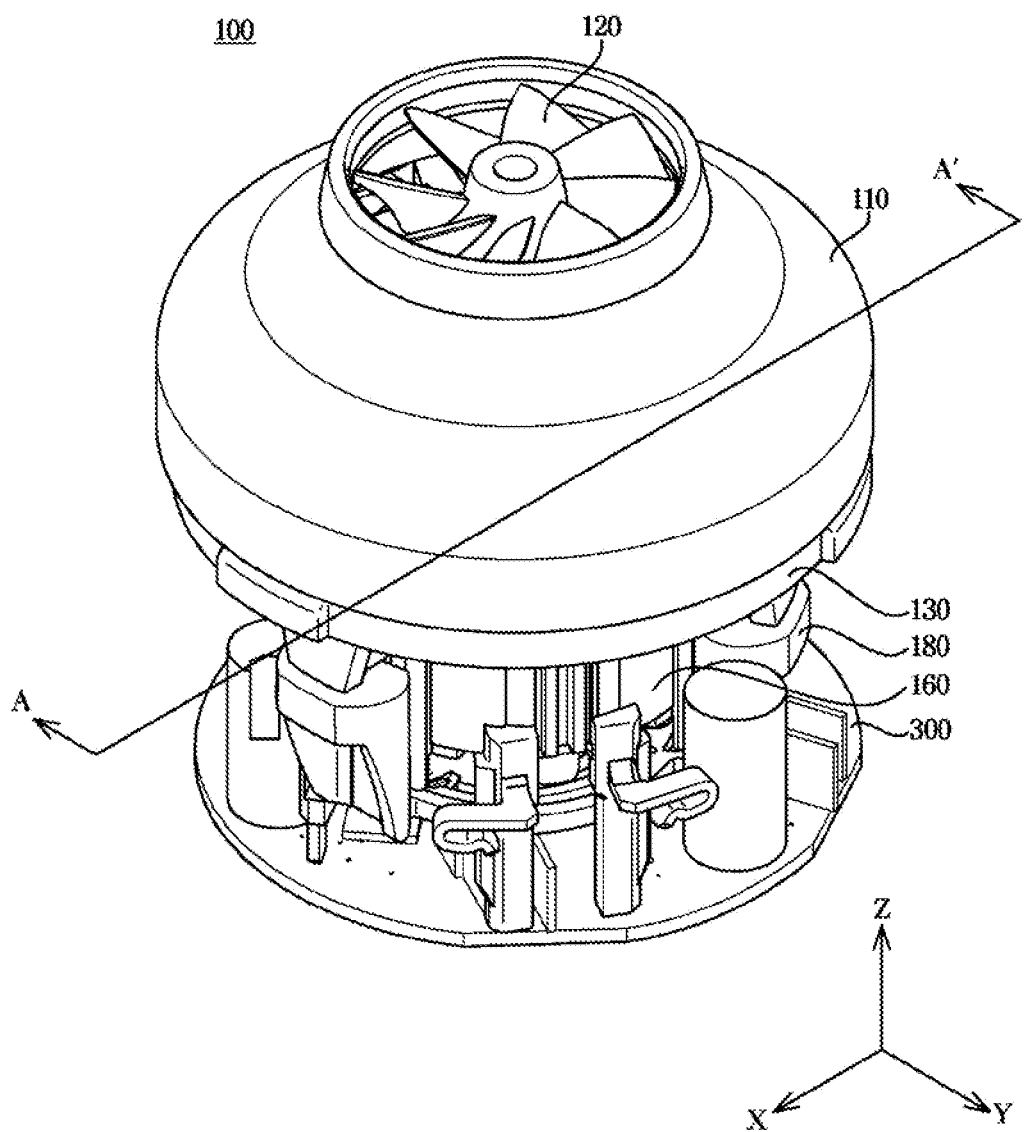
FIG. 2 is a perspective view of the motor according to one embodiment of the disclosure.
Figure 3:
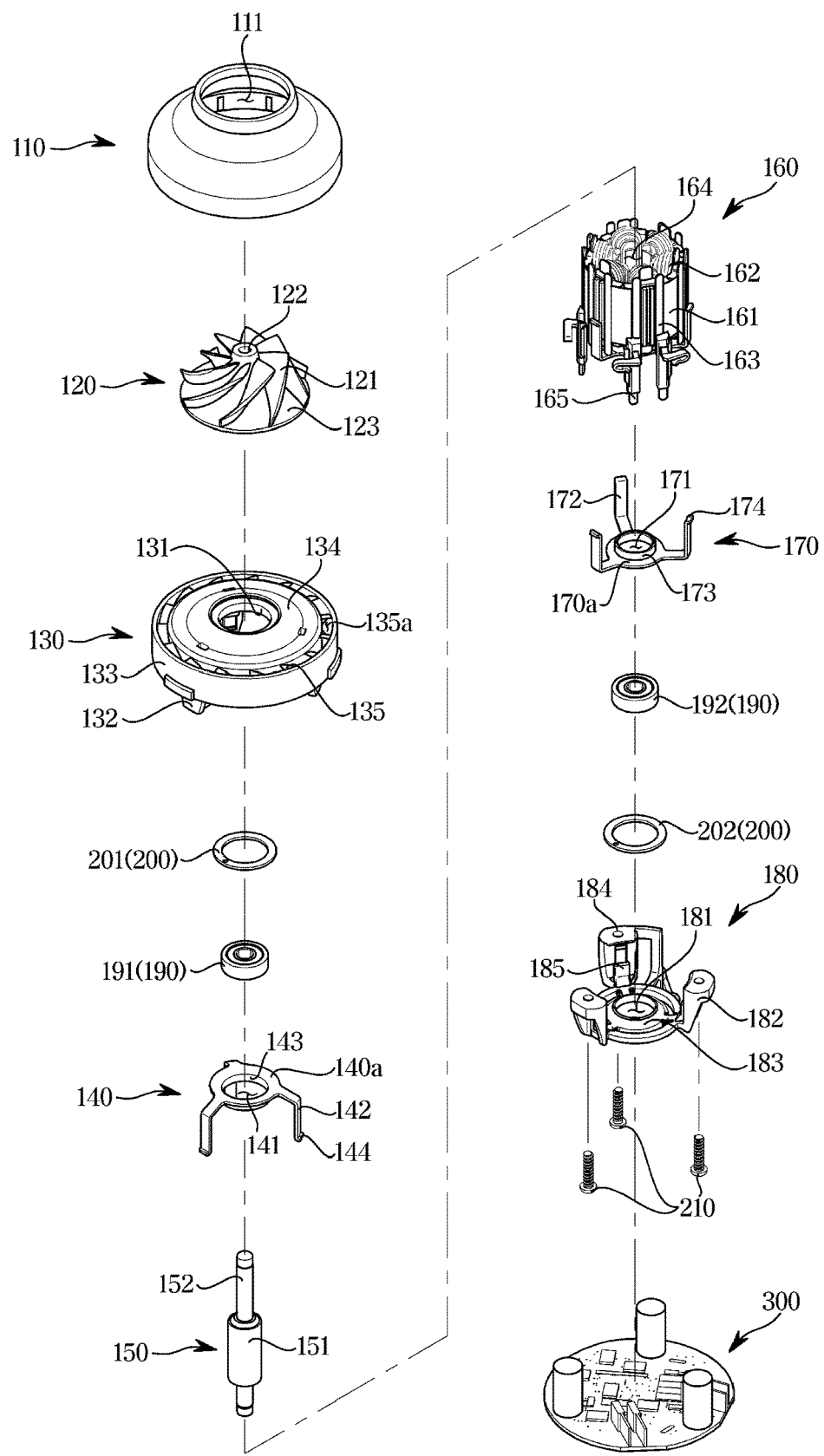
FIG. 3 is an exploded perspective view of the motor according to one embodiment of the disclosure.

FIG. 2 is a perspective view of the motor according to one embodiment of the disclosure. FIG. 3 is an exploded perspective view of the motor according to one embodiment of the disclosure.

Referring to FIGS. 2 and 3, the motor 100 may include a stator 160, a rotor assembly 150 and a housing 130, 180, an impeller 120 coupled to a rotating shaft 152 of the rotor assembly 150 to generate a flow of air, and a cover 110 covering the impeller 120 and guiding air drawn by the impeller 120, a controller 300 that controls the motor 100, a bearing 190 coupled to the housings 130, 180 so that the stator 160 and rotor 151 are securely coupled, and a cover member 200 disposed to surround an outer circumferential surface of the bearing 190.

The cover 110 may be provided to cover the impeller 120. In addition, the cover 110 may also include a guide member (not shown) to guide air drawn by the impeller 120. The cover 110 may be provided to be couple with a upper housing 130. The cover 110 may include an opening 111 provided to allow air to be drawn into the impeller 120.

The motor 100 may include the impeller 120 coupled to the rotating shaft 152 to generate a flow of air.

The impeller 120 may include a shaft coupling portion 122 to which the rotating shaft 152 is coupled. When the rotating shaft 152 is coupled to the shaft coupling part 122, the impeller 120 may rotate together with the rotating shaft 152.

The impeller 120 may include a hub 123 and a plurality of vanes 121 protruding from the hub 123 to form an airflow.

The hub 123 may be provided to have a smaller cross-sectional area along an axial direction of the rotating shaft 152 so that as the impeller 120 rotates, air drawn in the axial direction is exhausted in a radial direction of the rotating shaft 152. For example, the impeller may be provided to have a smaller cross-sectional area in the Z direction.

The plurality of vanes 121 may be provided on the hub 123 and rotate with the hub 123 to form the airflow. The plurality of vanes 121 may be provided on an outer surface of the hub 123.

The rotor 151 may be disposed on an inner surface of the hub 123, and the plurality of vanes 121 may be disposed on an outer surface of the hub 123 to form the airflow.

The housings 130, 180 may be provided to accommodate the stator 160 and rotor assembly 150. The housings 130, 180 may be formed by injection. Thus, the housings 130, 180 may have a relatively light weight compared to housings made of metal due to the use of an injection. The housings 130, 180 may include an upper housing 130 and a lower housing 180. The upper housing 130 may be a first housing 130, and the lower housing 180 may be a second housing 180.

The upper housing 130 and the lower housing 180 can be coupled between rotor 151 and stator 160. By coupling the upper housing 130 and the lower housing 180, the rotor 151 may be secured to the stator 160.

The upper housing 130 may include an upper frame seating portion 131 on which a first bearing 191 is seated. The upper frame seating portion 131 may be coupled to an upper frame 140. For example, the upper frame seating portion 131 may be coupled with a first forming rib 143, and the first bearing 191 may be seated in a first seating hole 141 formed by the first forming rib 143.

Further, the upper housing 130 may include a first coupling portion 132 that extends axially to couple with the lower housing 180. The upper housing 130 may be provided in a roughly cylindrical shape and may include an outer circumferential surface 133 provided to wrap around a portion of sides of the stator 160 and rotor 151, and a top surface 134 provided to cover a top surface of the stator 160 and rotor 151.

Further, the upper housing 130 may include a flow path 135a through which air exiting the impeller 120 flows and a diffuser vane 135 that guides the air flowing through the flow path 135a. The vane 135 may be integrally formed with the upper housing. For example, the vane 135 may be formed by injection together when the upper housing 130 is injection molded. Thus, productivity may be improved by not having to produce the diffuser separately or assemble it to the upper housing 130.

The first coupling portion 132 may extend axially from the outer circumferential surface 133 of the upper housing 130. The first coupling portion 132 may be provided to be spaced apart along the circumferential direction of the upper housing 130, and may be provided in a plurality. For example, the first coupling portions 132 may be provided with three. Furthermore, the number of first coupling portions 132 is not limited and may vary. The first coupling portion 132 may be a top coupling portion 132.

The lower housing 180 may include a lower frame seating portion 181 in which a second bearing 192 is provided to be seated. The lower frame seating portion 181 may be coupled to the lower frame 170. For example, the lower frame seating portion 181 may be coupled with a second forming rib 173, and the second bearing 192 may be seated in a second seating hole 171 formed by the second forming rib 173.

The lower housing 180 may include a second coupling portion 182 arranged to couple with the first coupling portion 132 of the upper housing. The second coupling portion 182 may be provided in correspondence to the number of first coupling portions 132. The first coupling portion 132 and the second coupling portion 182 may be coupled by various methods known in the art. For example, the first coupling portion 132 and the second coupling portion 182 may be coupled by a push fit coupling. The second coupling portion 182 may be a lower coupling portion 182. According to one of the various embodiments of the present disclosure, the upper housing 130 and the lower housing 180 may be coupled by a fastener 210. For example, the fastener 210 may include a tapping screw 210. Thus, because the upper housing 130 and the lower housing 180 can be coupled without processing separate tabs on the housings 130 and 180, productivity of the motor can be increased.

The bearing 190 may include a first bearing 191 coupled to an upper side of the rotating shaft 152 and a second bearing 192 coupled to a lower side of the rotating shaft 152. The first bearing 191 may be disposed between the upper housing 130 and the rotating shaft 152 to support rotation of the rotating shaft 152 while an axis of rotation of the rotating shaft 152 remains fixed. A second bearing 192 may be disposed between the lower housing 180 and the rotating shaft 152 to support rotation of the rotating shaft 152 while the axis of rotation of the rotating shaft 152 remains fixed.

The cover member 200 may be disposed to surround the outer circumferential surface of the bearing 190. For example, the cover member 200 may be provided to surround the outer ring of the bearing 190. The cover member 200 may be provided to cover an adhesive member 220 described later. More details will be described later. The cover member 200 may be provided with at least one cover member. For example, the at least one cover member 200 may include a first cover member 201 and a second cover member 202.

The motor 100 may further include a frame 140, 170. The frame 140, 170 may be coupled within the housing 130, 180 to increase the rigidity of the housing 130, 180. For example, the frames 140, 170 may be integrally formed with the housings 130, 180. In the FIGS., the frames 140, 170 are shown separated for illustrative purposes. The frames 140, 170 may be formed of metal. The frames 140 and 170 may be provided in plurality. The plurality of frames 140, 170 may include the upper frame 140 and a lower frame 170. The upper frame 140 may be a first frame 140, and the lower frame 170 may be a second frame 170. The frames 140 and 170 may be inserted during the mold injection of the housings 130 and 180. For example, the frames 140, 170 may be inserted first before injection of the housings 130, 180, and then the housings 130, 180 may be injected. Therefore, there is no need to go through a separate assembly process after each production, and productivity may be increased.

The upper frame 140 may be coupled to the upper housing 130. The upper frame 140 may be integrally formed with the upper housing 130. For example, after inserting the upper frame 140, the upper housing 130 may be injected. The upper frame 140 may include a first base 140a, a first seating hole 141, a first contact rib 142, a first forming rib 143, and a first coupling rib 144.

The first seating hole 141 may be formed in the first base 140a. In the first seating hole 141, the first bearing 191 may be seated. The first seating hole 141 may be provided in a shape corresponding to the first bearing 191. The first seating hole 141 may be formed to correspond to the upper frame seating portion 131.

The first contact rib 142 may extend downward from the first base 140a. For example, the first contact rib 142 may extend downward from an outer circumferential surface of the first base 140a. The first contact rib 142 may contact an outer circumferential surface of the stator core 161 to prevent the first bearing 191 from electrolytic corrosion. Details are described below.

The first forming rib 143 may extend downward from the first base 140a to form the first seating hole 141. For example, the first forming rib 143 may extend downward from the first base 140a to form the first seating hole 141 on an inner side of the first base 140a.

The first coupling rib 144 may protrude outward from one end of the first contact rib 142. The first coupling rib 144 may be coupled to the upper housing 130. For example, the first coupling rib 144 may be provided in a shape corresponding to an inner surface of the upper housing 130. Accordingly, the upper frame 140 and the upper housing 130 may be prevented from separating.

The lower frame 170 may be coupled to the lower housing 180. The lower frame 170 may be integrally formed with the lower housing 180. For example, the lower frame 170 can be inserted and then the lower housing 180 can be injected. The lower frame 170 may include a second base 170a, a second seating hole 171, a second contact rib 172, a second forming rib 173, and a second coupling rib 174.

A second seating hole 171 may be formed in the second base 170a. In the second seating hole 171, the second bearing 192 may be seated. The second seating hole 171 may be provided with a shape corresponding to the second bearing 192. The second seating hole 171 may be formed to correspond to the lower frame seating portion 181.

The second contact rib 172 may extend upward from the second base 170a. For example, the second contact ribs 172 may extend upward from an outer circumferential surface of the second base 170a. The second contact ribs 172 may contact the outer circumferential surface of the stator core 161 to prevent the second bearing 192 from electrolytic corrosion. Details are described below.

The second forming rib 173 may extend upward from the second base 170a to form the second seating hole 171. For example, the second forming rib 173 may extend upward from the second base 170a to form the second seating hole 171 on an inner side of the second base 170a.

The second coupling rib 174 may protrude outward from one end of the second contact rib 172. The second coupling rib 174 may be coupled to the lower housing 180. For example, the second coupling rib 174 may be provided in a shape corresponding to an inner surface of the lower housing 180. Accordingly, the lower frame 170 and the lower housing 180 may be prevented from separating.

The stator 160 may include a stator core 161, a stator coil 162, an insulator 163, and a rotor accommodating portion 164. The stator 160 may be configured to generate a magnetic flux when a current is applied to the stator coil 162.

A central portion of the stator core 161 may be provided with the rotor accommodating portion 164 to accommodate the rotor 151. The rotor 151 may be disposed in the rotor accommodating portion 164. The rotor 151 may electromagnetically interact with the stator 160.

The stator coil 162 may be wound on the stator core 161 with the insulator 163 coupled to the stator core 161.

The insulator 163 may be made of a material that is electrically insulating. The insulator 163 may be disposed on an outer side of the stator core 161. For example, the insulator 163 may be disposed on an outer circumferential surface of the stator core 161. There may be a plurality of insulators 163. The plurality of insulators 163 may be spaced apart from each other on the outer circumferential surface of the stator core 161.

The motor 100 may include an insertion portion 165 provided at a bottom of the insulator 163. The insertion portion 165 may be provided to be inserted into the controller 300.

The rotor 151 may include a rotating shaft 152. The rotating shaft 152 may be provided to rotate while the rotor 151 electromagnetically interacts with the stator 160.

The motor 100 may further include the controller 300 configured to control a speed of the motor. The controller 300 may be disposed at a lower portion of the motor, but is not limited thereto. The controller 300 may be disposed in various locations depending on the type of cleaner.

The motor 100 may further include a washer (not shown) disposed between the lower housing 180 and the second bearing 192. The washer (not shown) may apply preload to the bearing 190.

Figure 4:
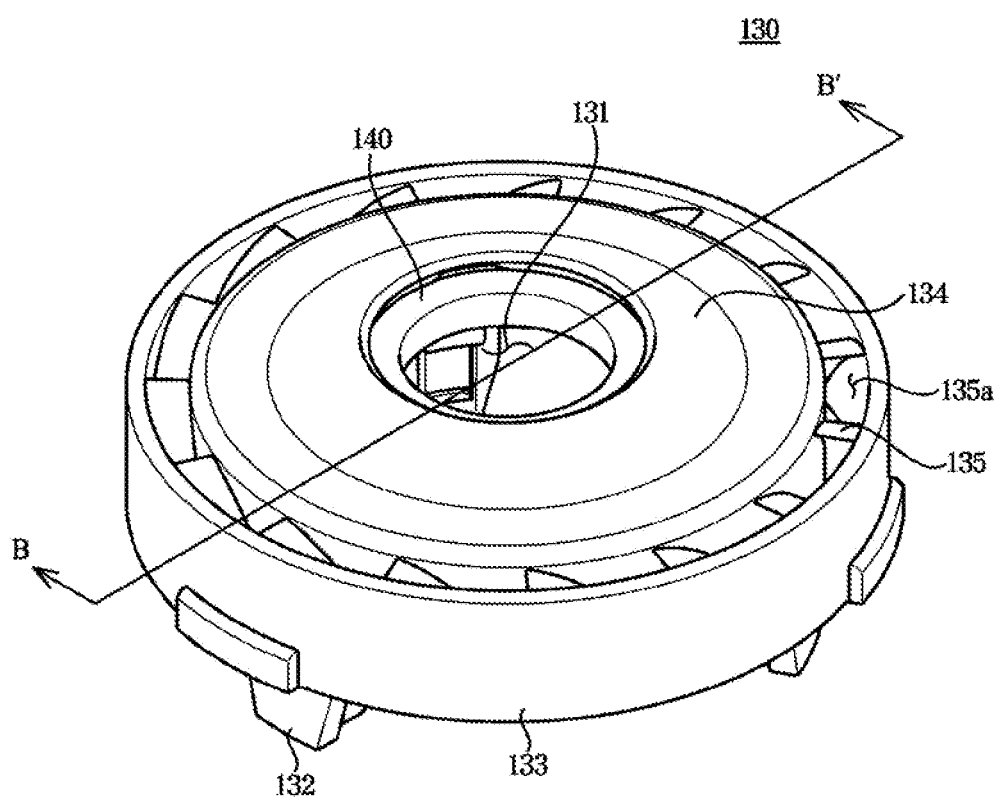
FIG. 4 is a perspective view of an upper housing and an upper frame in the motor according to one embodiment of the disclosure.
Figure 5:
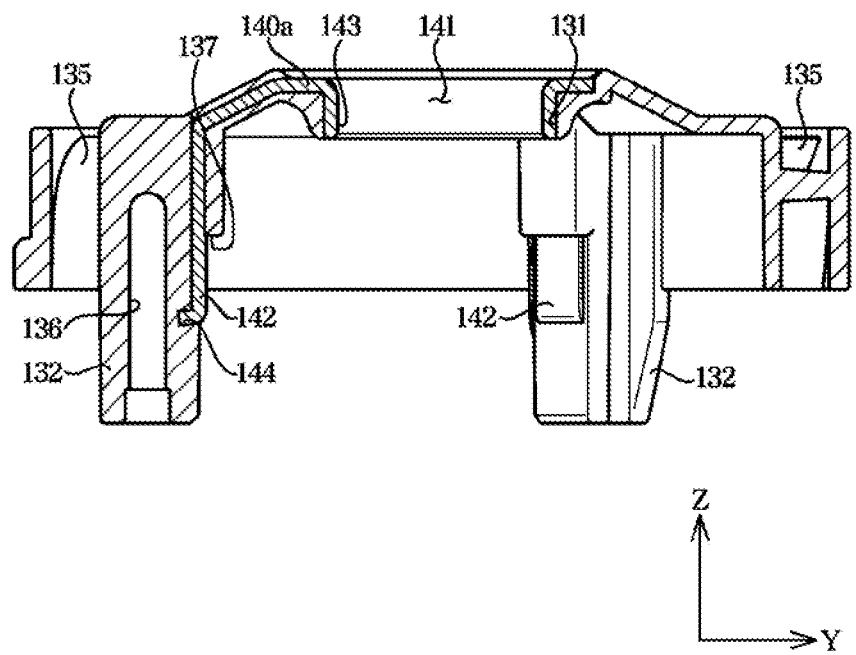
FIG. 5 is a cross-sectional view of the upper housing and the upper frame in the motor according to one embodiment of the disclosure.

FIG. 4 is a perspective view of an upper housing and an upper frame in the motor according to one embodiment of the disclosure. FIG. 5 is a cross-sectional view of the upper housing and the upper frame in the motor according to one embodiment of the disclosure.

FIG. 5 is a cross-sectional view of the upper housing 130 and the upper frame 140 shown in FIG. 4 taken along line B-B'.

Referring to FIGS. 4 and 5, according to one of the various embodiments of the present disclosure, the upper frame 140 and the upper housing 130 may be integrally formed. For example, the upper frame 140 may be inserted and then the upper housing 130 may be injection molded. The upper frame 140 may be formed of metal, and the upper housing 130 may be formed by injection.

According to one embodiment of the present disclosure, the first forming rib 143 may be inserted into the upper frame seating portion 131. The first forming rib 143 may form the first seating hole 141. In the first seating hole 141, the first bearing 191 may be seated. The first coupling rib 144 may couple with the inner surface of the upper housing 130. For example, the first coupling rib 144 may be formed to correspond to the upper housing 130.

According to one embodiment of the present disclosure, the upper housing 130 may include a first fastener hole 136.

The first fastener hole 136 may be inserted into the fastener 210. For example, the fastener 210 may be inserted to couple the upper housing 130 and the lower housing 180. The fastener 210 may be a tapping screw. The tapping screw 210 may couple the upper housing 130 and the lower housing 180 while forming the first fastener hole 136.

According to one embodiment of the present disclosure, the upper housing 130 may include a first support rib 137. The stator core 161 may be seated to the first support rib 137. Thus, the stator core 161 may be stably supported on the upper housing 130. Further, the stator core 161 may be supported by the first support rib 137. The first support rib 137 may be disposed on the inner side of the upper housing 130. For example, referring to FIG. 8, the first support rib 137 may be disposed on the upper side of the stator core 161. There may be a plurality of first support ribs 137.

Figure 6:
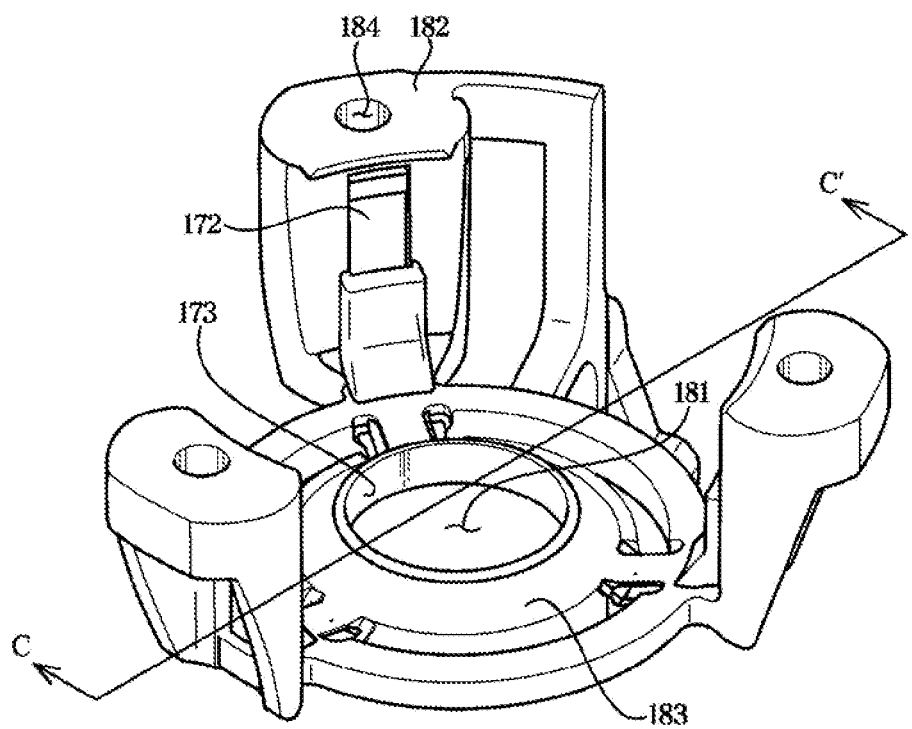
FIG. 6 is a perspective view of a lower housing and a lower frame in the motor according to one embodiment of the disclosure.
Figure 7:
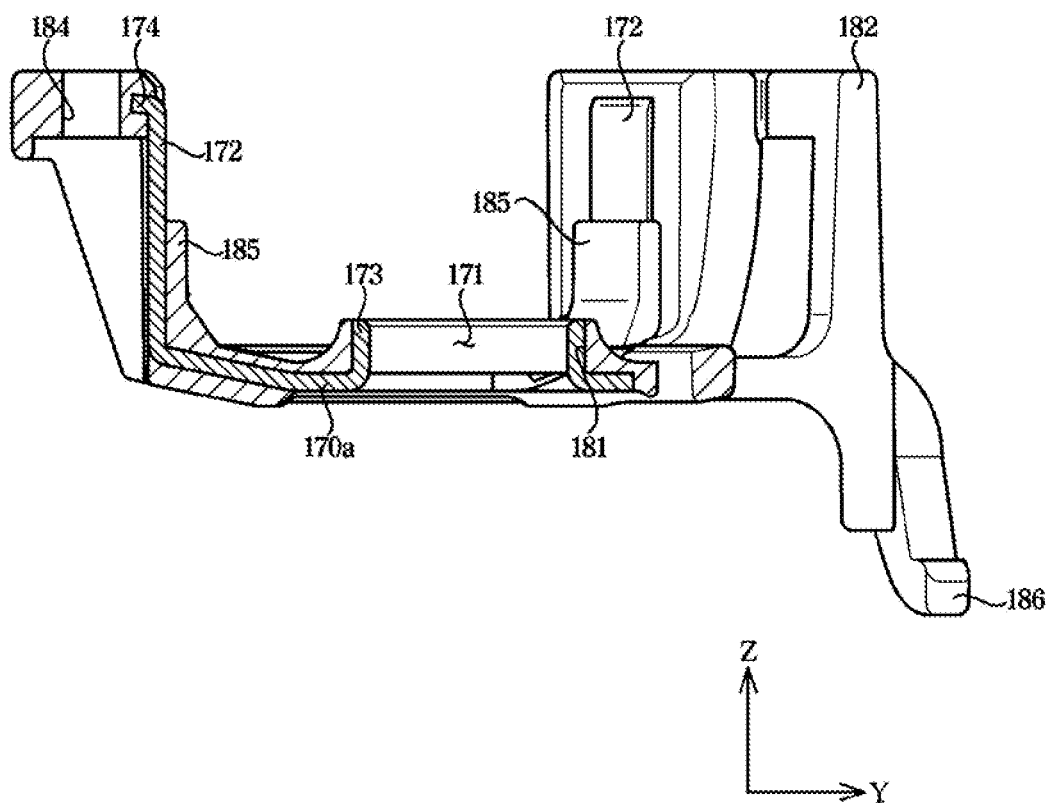
FIG. 7 is a cross-sectional view of the lower housing and the lower frame in the motor according to one embodiment of the disclosure.

FIG. 6 is a perspective view of a lower housing and a lower frame in the motor according to one embodiment of the disclosure. FIG. 7 is a cross-sectional view of the lower housing and the lower frame in the motor according to one embodiment of the disclosure. FIG. 7 is a cross-sectional view taken along the line C-C' in FIG. 6;

Referring to FIGS. 6 and 7, according to one of the various embodiments of the present disclosure, the lower frame 170 and the lower housing 180 may be integrally formed. For example, the lower frame 170 may be inserted and then the lower housing 180 may be injected. The lower frame 170 may be formed of metal, and the lower housing 180 may be formed by injection.

According to one embodiment of the present disclosure, the second forming rib 173 may be inserted into the lower frame seating portion 181. The second forming rib 173 may form the second seating hole 171. The second bearing 192 may be seated in the second seating hole 171. The second coupling rib 174 may be coupled to the inner surface of the lower housing 180. For example, the second coupling rib 174 may be formed to correspond to the lower housing 180.

According to one embodiment of the present disclosure, the upper housing 130 may include a second fastener hole 184. The second fastener hole 184 may be inserted with the fastener 210. The fastener 210 may be a tapping screw. The tapping screw 210 may couple the upper housing 130 and the lower housing 180 while forming the second fastener hole 184.

According to one embodiment of the present disclosure, the lower housing 180 may include a second support rib 185. The stator core 161 may seat on the second support rib 185. Thus, the stator core 161 may be stably supported on the lower housing 180. Further, the stator core 161 may be supported by the second support rib 185. The second support rib 185 may be disposed on the inner side of the lower housing 180. For example, referring to FIG. 8, the second support rib 185 may be disposed on a lower side of the stator core 161. There may be a plurality of second support ribs 185.

According to one embodiment of the present disclosure, the lower housing 180 may include a support portion 186. The support portion 186 may contact the controller 300 to allow the controller 300 to be supported.

Figure 8:
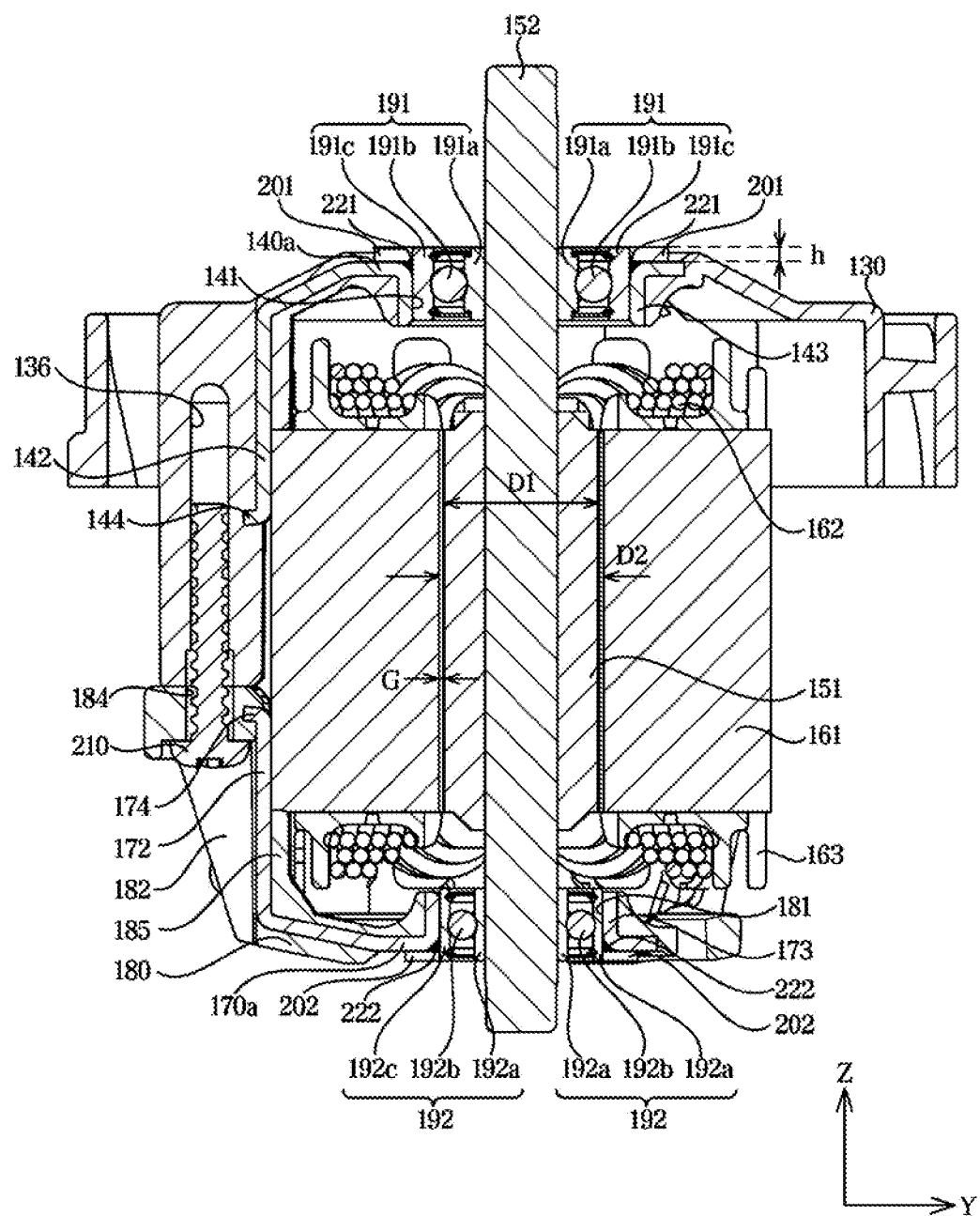
FIG. 8 is a cross-sectional view of the motor according to an embodiment of the disclosure.

FIG. 8 is a cross-sectional view of the motor according to an embodiment of the disclosure. 8 is a cross-sectional view taken along line A-A' in FIG. 2. In FIG. 8, the cover and the impeller are omitted.

Referring to FIG. 8, according to one of the various embodiments of the present disclosure, an inner diameter D2 of the stator core 161 may be provided to be larger than an outer diameter D1 of the rotor 151 to accommodate the rotor 151. Further, the inner diameter D2 of the stator core 161 may be greater than or equal to at least one diameter. The stator core 161 and the rotor 151 may include a gap G between the inner diameter D2 of the stator core 161 and the outer diameter D1 of the rotor 151 so that the stator core 161 and the rotor 151 interact electromagnetically. The gap G may be 1 mm or less. However, the size of the gap G is not limited.

According to one of various embodiments of the present disclosure, the bearings 190 may be seated in each of the plurality of seating holes 141 and 171. For example, the first bearing 191 may be seated in the first seating hole 141, and the second bearing 192 may be seated in the second seating hole 171. The bearing 190 may be disposed between the rotating shaft 152 and the forming ribs 143 and 173. For example, the first bearing 191 is disposed between the rotating shaft 152 and the first forming rib 143, and the second bearing 192 is disposed between the rotating shaft 152 and the second forming rib 173. An inner rings 191a, 192a of the bearing 190 may contact the rotating shaft 152, and an outer rings 191c, 192c of the bearing 190 may contact the forming ribs 143, 173 of the frame. For example, the inner ring 191a of the first bearing 191 may be in contact with the rotating shaft 152, and the outer ring 191c of the first bearing 191 may be in contact with the first forming rib 143. The inner ring 192a of the second bearing 192 may be in contact with the rotating shaft 152, and the outer ring 192c of the second bearing 192 may be in contact with the second forming rib 173.

According to one of the various embodiments of the present disclosure, frames 140, 170 may be in contact with stator core 161 and bearing 190, respectively. The frames 140, 170 may contact the outer circumferential surface of the stator core 161 and the outer rings 191c, 192c of the bearing 190, respectively. For example, the upper frame 140 may be in contact with the stator core 161 and the outer ring 191c of the first bearing 191. The lower frame 170 may be in contact with the stator core 161 and the outer ring 192c of the second bearing 192.

According to one of various embodiments of the present disclosure, the plurality of bearings 191 and 192 may include inner rings 191a and 192a, outer rings 191c and 192c, and balls 191b and 192b, respectively.

As described above, current may flow from the stator core 161 and rotor 151 to the rotating shaft 152 as induced current by switching. Also, because the rotating shaft 152 and the inner rings 191a, 192a of the bearing 190 are in contact, current may flow in the inner rings 191a, 192a of the bearing 190. Conversely, because the contact ribs 142, 172 contact the stator core 161, current may flow from the stator core 161 to the contact ribs 142, 172. Current flowing to the contact ribs 142, 172 may flow to the forming ribs 143, 173, which contact the outer rings 191c, 192c of the bearing 190. Current flowing through the forming ribs 143, 173 may flow to the outer rings 191c, 192c of the bearing 190. Thus, the induced currents generated by the stator core 161 and the rotor 151 may flow to the inner rings 191a, 192a of the bearing 190 and the outer rings 191c, 192c of the bearing 190 by different paths, so that no potential difference may occur between the inner rings 191a, 192a and the outer rings 191c, 192c of the bearing 190. As a result, electrolytic corrosion of the ball bearing 190 may be prevented.

According to one of the various embodiments of the present disclosure, there may be a height difference H between the bearings 190 and the frames 140, 170. For example, the first bearing 191 may be disposed at a higher position than the first base 140a, and the second bearing 192 may be disposed at a lower position than the second base 170a. The first bearing 191 and the first base 140a may have a height difference h, and the second bearing 192 and the second base 170a may have a height difference h. The first bearing 191 may protrude upwardly from the first base 140a. The second bearing 192 may protrude downwardly from the second base 170a. Thus, when the adhesive is applied as illustrated below, the adhesive may run over the bearings 190 and bond the inner rings 191a, 191b and the rotating shaft 152, which can be prevented because the bearings 190 and the bases 140a, 170a have a height difference h.

The adhesive may be applied to adhere the bearing 190 to the frame 140, 170. For example, an adhesive member may be disposed between the bearing 190 and the frame 140, 170. At least one adhesive member 220 may be provided. For example, the at least one adhesive member 220 may include a first adhesive member 221 disposed between the first bearing 191 and the upper frame 140 and a second adhesive member 222 disposed between the second bearing 192 and the lower frame 170. The adhesive may be an anaerobic adhesive. Anaerobic adhesives can cure quickly in areas that are not in contact with air, which can reduce adhering time. Also, because the bearing 190 and the frames 140, 170 are formed of metal, the adhesion between homogeneous materials may be strong.

The motor 100 may further include the cover member 200. The cover member 200 may cover the adhesive member 220 to allow the adhesive to cure quickly and improve adhesion. The cover member 200 may be coupled to the housing 130, 180 and frame 140, 170 after the adhesive is applied. For example, the first cover member 201 may be disposed on an outer side of the first bearing 191 and may be disposed on a top surface of the upper frame 140. The second cover member 202 may be disposed on an outer side of the second bearing 192, and may be disposed on a bottom surface of the lower frame 170. As the cover member 200 covers the adhesive member 220, it has been confirmed through experiments that the coupling force between the bearing 190 and the frames 140 and 170 is improved.

The cover member 200 may be made of metal. The cover members 200 may be in contact with the outer rings 191c, 192c of the bearing 190 and the frames 140, 170. For example, the first cover member 201 may be in contact with each of the outer ring 191c and the first base 140a of the first bearing. The second cover member 202 may be in contact with each of the outer ring 192c and the second base 170a of the second bearing. The cover members 200 may allow for better electrical communication between the outer rings 191c, 192c of the bearings and the frames 140, 170. Although a plurality of cover members 200 are shown in the FIGS., there may be only one cover member 200. For example, the cover member 200 may be disposed only between the first bearing 191 and the first base 140a.

According to one embodiment of the present disclosure, the first bearing 191 may be provided to have a larger cross-sectional area than the second bearing 192. Although not shown in FIGS. 8, the impeller 120 may be disposed on the top of the first bearing 191. The first bearing 191 may have a larger cross-sectional area than the second bearing 192 to support the load of the impeller 120. The diameter ratio of the first bearing 191 and the second bearing 192 may be 1.1 to 1.6. However, the diameter ratio is not limited to this.

Further, the plurality of seating holes 141, 171 may be formed with a size corresponding to each of the plurality of bearings 191, 192. Thus, the first seating hole 141 may be formed larger than the second seating hole 171. For example, the first seating hole 141 may have a larger area than the second seating hole 171.

In the above, specific embodiments have been illustrated and described. However, it is not limited to the above embodiments, and those skilled in the art can make various modifications without departing from the gist of the technical idea of the disclosure set forth in the following claims.

What is claimed is:

1. A motor comprising:
    a stator including a stator core;
    a rotor inside the stator and including a rotating shaft, the rotor configured to electromagnetically interact with the stator to rotate the rotating shaft;
    a housing to accommodate the stator and the rotor;
    a bearing coupled to the housing so that the bearing supports rotation of the rotating shaft while the stator and the rotor are stably accommodated in the housing; and
    a frame in the housing and configured to support the bearing in the housing, the frame including a contact rib that is in contact with an outer circumferential surface of the stator core and an outer ring of the bearing such that the stator core and the bearing are electrically connected,
        wherein the housing includes at least one support rib that is on an inner side of the contact rib, and
        wherein an axial end of the stator core contacts the at least one support rib.

2. The motor of claim 1, wherein
    the frame is formed of metal, and
    the housing is injection molded with the frame inserted therein so that the frame is integrally formed with the housing.

3. The motor of claim 2, wherein
    the frame includes an upper frame above the stator core and a lower frame below the stator core, and
    the bearing includes a first bearing that is seated on the upper frame and a second bearing that is seated on the lower frame.

4. The motor of claim 3, wherein
    the upper frame includes a first seating hole at an upper end of the upper frame and the first bearing is seated in the first seating hole, and
    the lower frame includes a second seating hole at a lower end of the lower frame and the second bearing is seated in the second seating hole.

5. The motor of claim 4, wherein
    the upper frame includes:
        a first base on which the first seating hole is formed, and
        a first contact rib that extends downward from the first base and contacts the stator core, and
    the lower frame includes:
        a second base on which the second seating hole is formed, and
        a second contact rib that extends upward from the second base and contacts the stator core.

6. The motor of claim 5, wherein
    the first contact rib and the second contact rib contact respective portions of an outside of the stator core, and
    the at least one support rib is on an inner side of at least one of the first contact rib or the second contact rib to support the stator core.

7. The motor of claim 1, further comprising
    an adhesive member to couple the frame and the bearing; and
    at least one cover member configured to cover the adhesive member to improve an adhesive strength of the adhesive member.

8. The motor of claim 7, wherein
    the frame includes:
        an upper frame above the stator core and including:
            a first base formed on an upper portion of the upper frame, and
            a first seating hole formed in the first base, and
        a lower frame below the stator core and including:
            a second base formed on a lower portion of the lower frame, and
            a second seating hole formed in the second base,
    the bearing includes:
        a first bearing seated in the first seating hole, and
        a second bearing seated in the second seating hole,
    the adhesive member includes:
        a first adhesive member coupling the upper frame and the first bearing, and
        a second adhesive member coupling the lower frame and the second bearing, and
    the at least one cover member is configured to cover the first adhesive member and/or the second adhesive member.

9. The motor of claim 8, wherein
    the first bearing protrudes upward more than the first base,
    the first adhesive member surrounds an outer ring of the first bearing that protrudes upward from the first base,
    the second bearing protrudes downward more than the second base, and
    the second adhesive member surrounds an outer ring of the second bearing that protrudes downward from the second base.

10. The motor of claim 3, further comprising:
    an impeller coupled to an upper portion of the rotating shaft outside the housing, and configured to generate an air flow,
    wherein, to support a load of the impeller, a cross-sectional area of the first bearing is larger than a cross-sectional area of the second bearing.

11. The motor of claim 3, wherein a diameter ratio corresponding to a diameter of the first bearing divided by a diameter of the second bearing is 1.1 to 1.6.

12. The motor of claim 3, wherein
    the upper frame is in the housing and is in contact with the outer circumferential surface of the stator core and an outer ring of the first bearing so that the stator core and the first bearing are electrically connected, and
    the lower frame is in the housing and is in contact with the outer circumferential surface of the stator core and an outer ring of the second bearing so that the stator core and the second bearing are electrically connected.

13. The motor of claim 3, wherein
    the upper frame includes the contact rib that includes a first contact rib that is in contact with the outer circumferential surface of the stator core and an outer ring of the first bearing so that the stator core and the first bearing are electrically connected, and the at least one support rib includes a first support rib on an inner side of the first contact rib, and in contact with a first radial surface of the stator core so as to support the stator core in the housing, and
    the lower frame includes the contact rib that includes a second contact rib that is in contact with the outer circumferential surface of the stator core and an outer ring of the second bearing so that the stator core and the second bearing are electrically connected, and the at least one support rib includes a second support rib on an inner side of the second contact rib, and in contact with a second radial surface of the stator core so as to support the stator core in the housing.

\* \* \* \* \*